P. F. MURPHY.
PLUMBING TRAP.
APPLICATION FILED DEC. 24, 1906.
922,312.
Patented May 18, 1909.
2 SHEETS—SHEET 1.
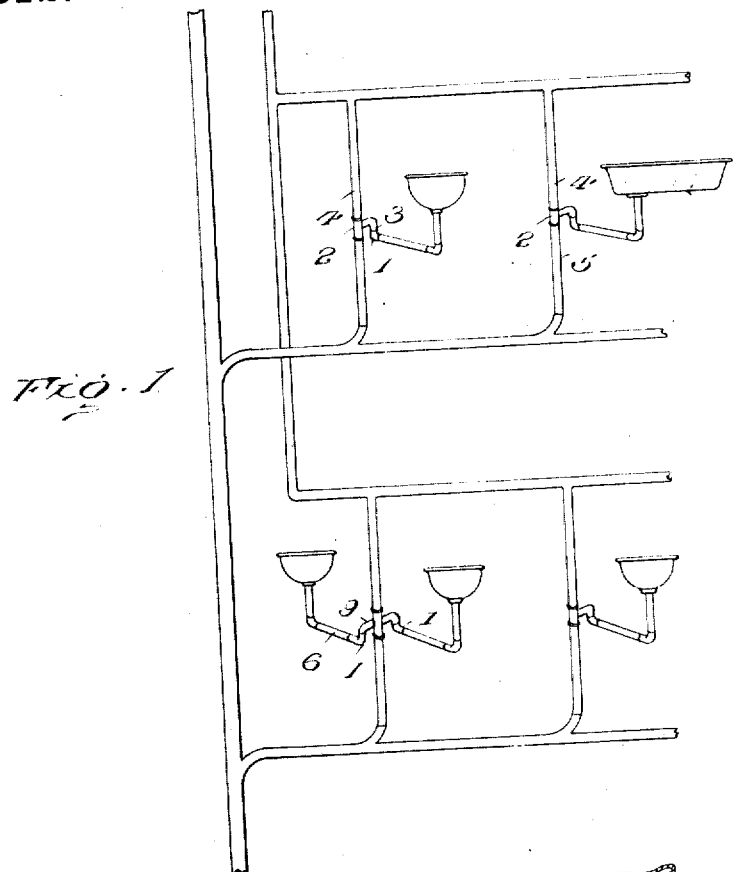
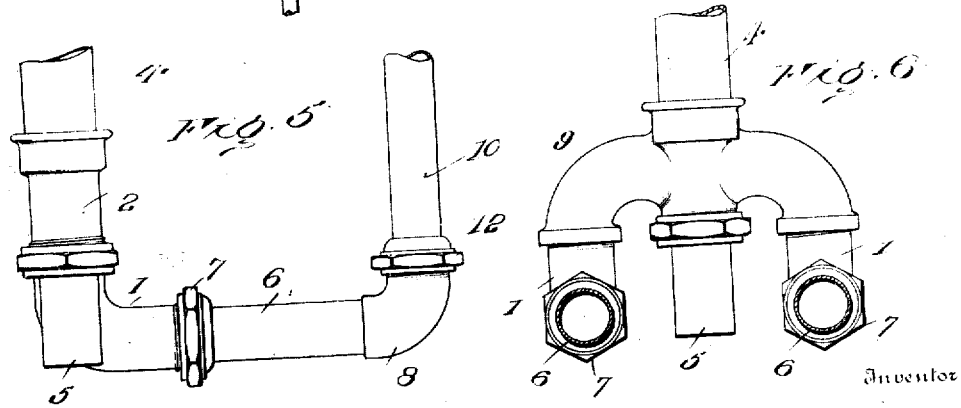

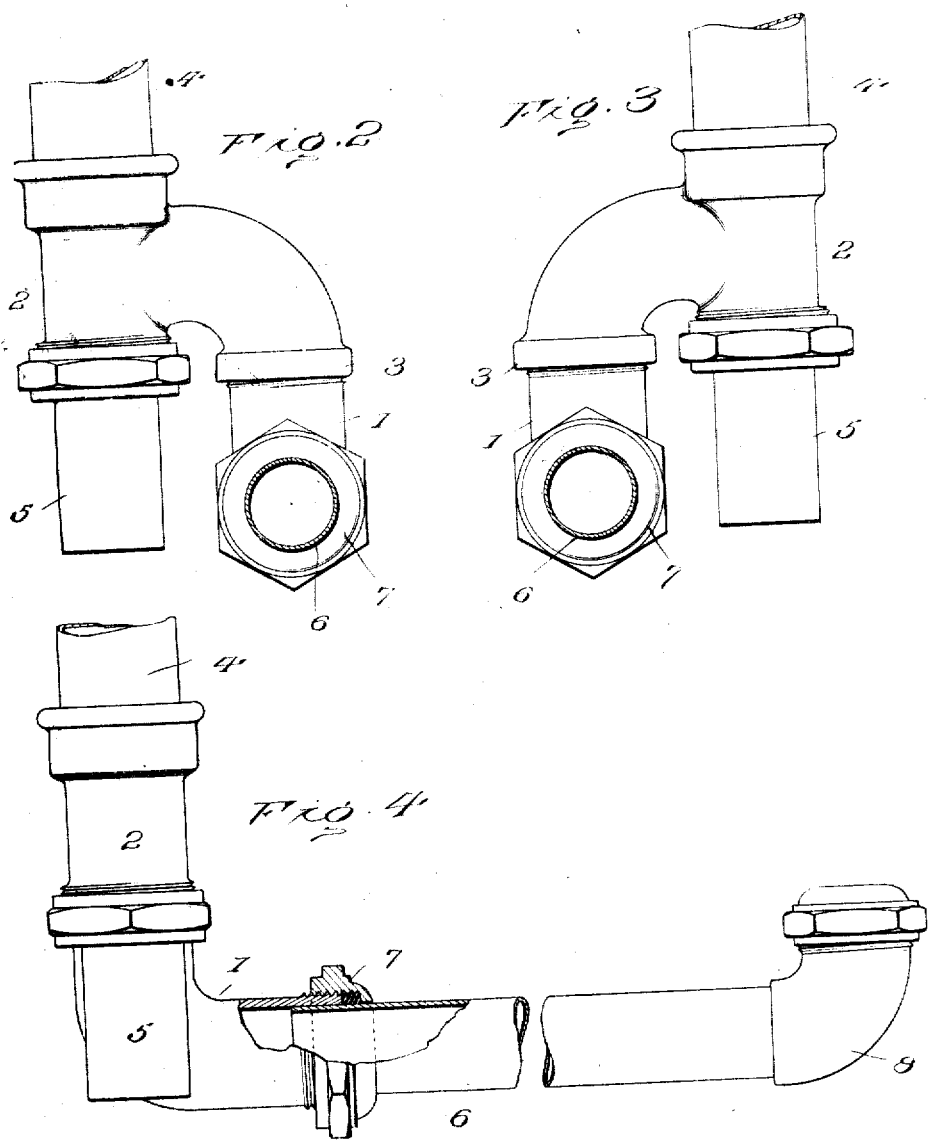

UNITED STATES PATENT OFFICE.

PETER F. MURPHY, OF MILWAUKEE, WISCONSIN.

PLUMBING-TRAP.

No. 922,312.

Specification of Letters Patent.

Patented May 18, 1909.

Application filed December 24, 1906. Serial No. 349,300.

*To all whom it may concern:*

Be it known that I, PETER F. MURPHY, of Milwaukee, in the county of Milwaukee and State of Wisconsin, have invented certain new and useful Improvements in Plumbing-Traps; and I do hereby declare the following to be a full, clear, and exact description of the invention, such as will enable others skilled in the art to which it appertains to make and use the same.

The plumbing regulations in many municipalities require that each fixture be separately trapped; that traps be placed directly below the fixtures they serve, and that they be revented from their crowns, the object being to shorten the fouling surface between the trap-seal and the fixture; to insure a complete ventilation of the waste pipe, and to prevent the loss of the trap seal by syphonage. In order to conform to such requirements, the practice has been to place the trap below the fixture and to extend the waste pipe connection through the wall; and the revent pipe has also been carried through the wall above the waste pipe and connected to the trap at the crown. This is objectionable, first, because the trap, as well as a great deal of piping, is exposed to view, presenting an unsightly appearance, interfering with the proper cleaning of the floor and wall below the fixture; and secondly, the seal of the trap cannot be brought sufficiently close to the outlet of the fixture, and that portion of the pipe above the trap seal becomes foul and gives off an offensive odor, which escapes through the fixture into the room.

The main object of my invention is to obviate all these objections; to reduce the material required; to lessen the labor involved; and generally to improve, simplify and cheapen the trapping and reventing of plumbing fixtures.

Other objects are to provide a trap which may be used for either right or left hand connections; one which has an extensible well adaptable to the varied conditions; and one which may be used in numbers in connection with branch waste and revent pipes to drain a series of fixtures, or into which a number of fixtures grouped together may be drained, each fixture having a separate trap seal and at the same time a common branch waste pipe and branch revent pipe.

The invention will be hereinafter fully set forth and particularly pointed out in the claims.

In the accompanying drawings, Figure 1 is a diagrammatic view showing the general arrangement of several series of fixtures connected to waste and revent pipes and embodying my improvements. Figs. 2 and 3 are enlarged views of the trap detached, showing it adapted for right and left hand connections. Fig. 4 is a view at right angles to Fig. 2. Fig. 5 is a similar view showing the well of the trap shortened. Fig. 6 is a modification.

Referring to the drawings, 1 designates the outlet bend of the trap, which is connected to the lower end of a lateral elbow of a chambered fitting 2 by a swiveled or screw threaded joint 3, permitting the trap to be used for right and left hand connections. I have shown fitting 2 as in the form of a T, but any suitable arrangement, provided it has a chamber and a lateral elbow, may be employed. The fitting 2 is designed to be connected at its top or upper end, on the sewer-connection side of the device as a whole, to a branch revent pipe 4 and at its lower end to a branch waste pipe 5. As shown in Fig. 2, the trap is set for a right hand connection, while it is shown in Fig. 3 as set for left hand connection. The horizontal arm of the outlet bend 1 is designed to project through the wall or partition within which it is located.

6 designates the well of the trap, which consists of a pipe slidably fitted at one end to the free end of the outlet bend 1, to which it may be secured by any suitable means, as by a nut 7. To the other end of this pipe is secured the inlet or receiving bend 8, which is connected by means of a pipe 10 to the outlet of the fixture, such pipe being adjustably secured to the inlet bend by nut 12. After the fitting 2 has been connected to the waste and revent pipes, both of which are located in the wall or partition, and after the latter has been finished, leaving only the end of the horizontal arm of the outlet bend exposed, the fixture may be installed. Of course, if desired, any portion of the fitting may be left exposed, and in remodeling work it is often difficult to conceal the trap, but its simplicity and compactness makes the work more attractive than otherwise.

The outlet bend may be turned on the swivel joint at any angle relative to the wall after the latter has been finished. The well pipe 6 may be moved longitudinally relative to the outlet bend, so that the inlet bend may be readily brought directly below the outlet of the fixture to be drained, no matter in what position it may be, and the pipe may be adjusted vertically in accordance with the height of the outlet bend from the floor. The inlet bend is of such a depth as to permit the fixture to be completely and thoroughly drained, sealing water always remaining in the well and inlet and outlet bends.

As it but rarely happens that the outlet of a fixture can be placed exactly opposite the openings in the wall intended to receive its discharge, and as the distance of the outlet from the wall and the height above the floor varies very much in different fixtures, the described simple and convenient horizontal and vertical adjustments result in a great saving of material and labor.

Ordinarily a single waste and revent pipe connecting fitting may be employed for each fixture, but one fitting may be common to two fixtures, being provided with two lateral elbows and two outlet bends, as shown at 9. In fact, there may be even more than two elbows extended from a single fitting, if it be desired to connect up a greater number of fixtures. When this is done, it is manifest that the draining of one trap will not in any way affect the seal of the remaining trap or traps. Economy is involved in that while each fixture has its own trap, there is a common waste and revent pipe connection.

In practice, the waste and revent pipe connecting fitting, together with its lateral elbow, is designed to be located within a wall or partition, preferably the free end of the horizontal portion of the outlet bend being alone projected through the wall. The well of the trap, which is connected to the projecting end of the bend, is elongated, and within certain limits the extent of its projection beyond the outlet bend may be adjusted by its sliding connection therewith according to the distance at which the fixture is located from the wall. Pipes of different lengths may be substituted when necessary. It has heretofore been necessary to have the pipes forming the connections with the waste and the revent pipes both of a length to correspond to the distance the trap may be set, but by my invention I save the cost of one of these pipes, and have but the single pipe exposed to view.

I claim as my invention:

1. The herein described trap consisting of a chambered fitting designed to be attached at its upper portion, on the sewer connection side, to a revent pipe, and at its lower portion to a waste pipe, an elbow communicating with the chamber of said fitting, an extensible pipe connected to the free or lower end of such elbow forming the well of the trap, and an upwardly projecting inlet bend on the other end of such pipe designed to be connected to a fixture.

2. The herein described multiple trap consisting of a chambered fitting designed to be attached at its upper portion, on the sewer connection side, to a revent pipe, and at its lower portion to a waste pipe, a series of elbows, each communicating at its upper end with the chamber of said fitting, extensible pipes connected to the free or lower ends of said elbows, forming wells of the several traps, and upwardly projecting inlet bends on the free ends of said pipes designed to be connected to separate fixtures.

3. The herein described trap, consisting of a chambered fitting designed to be attached at its upper portion to a revent pipe, and at its lower portion to a waste pipe, an elbow connected at its upper end to said fitting, an extensible pipe forming the well of the trap, means connecting said pipe to said elbow, such pipe being extended laterally from said elbow, an inlet bend on the free end of said pipe, and a vertically disposed pipe projecting from said inlet bend and designed to be connected at its upper end to a fixture.

4. The herein described trap, consisting of a chambered fitting designed to be attached at its upper portion to a revent pipe, and at its lower portion to a waste pipe, an elbow connected at its upper end to said fitting, a pipe forming the well of the trap, means connecting said pipe to said elbow, such pipe being extended laterally from said elbow, an inlet bend on the outer end of said pipe, and a pipe on the free end of such inlet bend designed to be connected at its upper end to a fixture.

5. The herein described trap, consisting of a chambered fitting designed to be attached at its upper portion, on the sewer-connection side, to a revent pipe, and at its lower portion to a waste pipe, an elbow movably connected at its upper end to said fitting, a pipe connected at one end to said elbow, and an inlet bend on the other end of said latter pipe designed to be connected to a fixture.

6. The herein described trap, consisting of a chambered fitting designed to be attached at its upper portion to a revent pipe, and at its lower portion to a waste pipe, an elbow movably connected at its upper end to said fitting, a laterally extended pipe fitted telescopically in the other end of said elbow, an inlet bend on the free end of said pipe, and a vertically disposed pipe projecting from said elbow and designed to be connected to a fixture.

7. The herein described trap comprising a fitting of approximately T-shape having a curved elbow designed to form the crown of the trap, an outlet bend detachably fitted to the end of said elbow and adjustable on a horizontal plane relative thereto, a horizontally disposed pipe detachably fitted in the lower free end of said outlet bend and capable of being extended longitudinally with respect thereto, said pipe forming the well of the trap and an inlet bend on the free end of said pipe designed to be secured to a fixture.

In testimony whereof, I have signed this specification in the presence of two subscribing witnesses.

PETER F. MURPHY.

Witnesses:
GERALD L. MULLANEY,
E. B. SIMPSON.